US011130830B2

(12) United States Patent
Zhang et al.

(10) Patent No.: US 11,130,830 B2
(45) Date of Patent: Sep. 28, 2021

(54) PROCESS FOR PREPARING AN ACETOACETYL FUNCTIONAL POLYMER

(71) Applicants: Dow Global Technologies LLC, Midland, MI (US); Rohm and Haas Company, Collegeville, PA (US)

(72) Inventors: Jiguang Zhang, Shanghai (CN); Jian Zou, Shanghai (CN); Yahong Zhang, Shanghai (CN); Hongyu Chen, Shanghai (CN); Zheng Zhang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 19 days.

(21) Appl. No.: 16/617,311

(22) PCT Filed: May 29, 2017

(86) PCT No.: PCT/CN2017/086486
§ 371 (c)(1),
(2) Date: Nov. 26, 2019

(87) PCT Pub. No.: WO2018/218468
PCT Pub. Date: Dec. 6, 2018

(65) Prior Publication Data
US 2020/0148801 A1  May 14, 2020

(51) Int. Cl.
*C08L 33/14* (2006.01)
*C08F 220/28* (2006.01)
*C08F 220/14* (2006.01)
*C09D 133/06* (2006.01)
*C09D 133/14* (2006.01)
*C08K 5/07* (2006.01)

(52) U.S. Cl.
CPC ........ *C08F 220/283* (2020.02); *C08F 220/14* (2013.01); *C08K 5/07* (2013.01); *C08L 33/14* (2013.01); *C09D 133/062* (2013.01); *C09D 133/14* (2013.01); *C08F 2800/20* (2013.01)

(58) Field of Classification Search
CPC .. C08F 220/283; C08F 220/14; C08F 220/10; C08L 33/14; C08K 5/07
See application file for complete search history.

(56) References Cited

U.S. PATENT DOCUMENTS

| | | | |
|---|---|---|---|
| 4,408,018 A | 10/1983 | Bartman et al. | |
| 5,362,798 A * | 11/1994 | Hayes | C08F 236/10 428/507 |
| 5,932,406 A | 8/1999 | Adegawa | |
| 5,969,046 A | 10/1999 | Schindler et al. | |
| 6,040,368 A | 3/2000 | Maver et al. | |
| 6,117,492 A | 9/2000 | Goldstein et al. | |
| 6,262,169 B1 * | 7/2001 | Helmer | C08K 5/17 524/555 |
| 6,506,696 B2 | 1/2003 | Goldstein et al. | |
| 6,897,262 B2 * | 5/2005 | Pears | C08F 8/30 525/328.6 |
| 7,855,261 B2 * | 12/2010 | Kuo | B01J 20/26 526/318.3 |
| 9,803,045 B2 * | 10/2017 | Killilea | C09D 175/16 |
| 2004/0082707 A1 | 4/2004 | Pears | |
| 2006/0135686 A1 | 6/2006 | Killilea et al. | |
| 2011/0160368 A1 | 6/2011 | Bohling et al. | |
| 2012/0157609 A1 | 6/2012 | Maddox | |
| 2012/0157610 A1 * | 6/2012 | Maddox | C09D 5/02 524/558 |

FOREIGN PATENT DOCUMENTS

CN     105273539 A    1/2016

OTHER PUBLICATIONS

PCT/CN2017/086486, International Search Report and Written Opinion dated May 29, 2017.

* cited by examiner

*Primary Examiner* — Robert C Boyle

(57) ABSTRACT

A suspension process for preparing an acetoacetyl functional polymer and the acetoacetyl functional polymer made from the process suitable for aldehyde abatement.

7 Claims, No Drawings

PROCESS FOR PREPARING AN ACETOACETYL FUNCTIONAL POLYMER

FIELD OF THE INVENTION

The present disclosure relates to a process for preparing an acetoacetyl functional polymer and the acetoacetyl functional polymer made therefrom.

INTRODUCTION

Acetoacetyl functional emulsion polymers have been known as aldehyde abatement materials in coating applications. However, hydrolysis of the acetoacetyl functional groups in these emulsion polymers tend to occur during storage in containers, which causes an unsafe buildup of pressure resulting in safety concerns. Thus, acetoacetyl functional emulsion polymers usually contain a low content of acetoacetyl functional groups. For example, the content of acetoacetyl functional monomers used for preparing the acetoacetyl functional emulsion polymers usually cannot be higher than 10% by weight of the total monomers.

Aldehyde abatement materials are also desirable in other applications, such as automotives. Automobile interior parts are typically made by melt processing thermoplastic polyolefin (TPO) compositions. Increasing pressures and consumer concerns on car interior air quality have led to government regulations that limit the concentration of volatile organic compounds (VOCs), such as aldehydes, permissible in automobile interior parts. Addition of aldehyde absorbers, such as micro porous aluminosilicate and zeolite powder, can reduce aldehydes in TPO compositions through physical absorption. However, the aldehyde abatement efficiency of such aldehyde absorbers tends to decrease with time or at elevated temperatures. Including processing aids such as water, $N_2$ and $CO_2$ can remove VOCs of TPO compositions during extrusion, but such an approach demands an additional step of separating out VOCs-containing vapor during vacuum degassing, which involves additional facility costs.

Therefore, it is desirable to develop a novel process for preparing acetoacetyl functional polymers with higher content of acetoacetyl functional groups than those obtained by emulsion polymerization processes, where the obtained acetoacetyl functional polymers are useful for aldehyde abatement but have limited impacts on existing processing facilities.

SUMMARY OF THE INVENTION

The present disclosure provides a novel process for preparing acetoacetyl functional polymers by suspension polymerization of a monomer composition comprising, based on the total weight of the monomer composition, from 21% to 80% by weight, such as from 30% to 80% by weight, of acetoacetyl functional monomers. The acetoacetyl functional polymer of the present disclosure is useful for reducing aldehydes and demonstrates higher formaldehyde abatement efficiency than incumbent polymers obtained by emulsion polymerization. In addition, the acetoacetyl functional polymer can be applied in solution or melt processes while having limited impacts on existing processing facilities.

In a first aspect, the present disclosure relates to a process for preparing an acetoacetyl functional polymer by suspension polymerizing a monomer composition in the presence of a chain transfer agent and a stabilizer, wherein the monomer composition comprises, based on the total weight of the monomer composition, from 21% to 80% by weight of an acetoacetyl functional monomer.

In a second aspect, the present disclosure relates to an acetoacetyl functional polymer having an average particle size of from 10 to 2000 micrometers, wherein the acetoacetyl functional polymer has a number average molecular weight of from 2,000 to 300,000 and comprises, as polymerized units, from 21% to 80% by weight of an acetoacetyl functional monomer.

In a third aspect, the present disclosure relates to a process for removing aldehydes from a polymer composition comprising aldehydes by adding to the polymer composition the acetoacetyl functional polymer prepared by the process of the first aspect.

DETAILED DESCRIPTION OF THE INVENTION

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this disclosure, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate. "Polymerized unit" as used herein, also known as "structural unit", of the named monomer refers to the remnant of the monomer after polymerization.

A "thermoplastic" material is a linear or branched polymer which can be repeatedly softened and made flowable when heated and returned to a hard state when cooled to room temperature (20-25° C.). In addition, thermoplastics can be molded or extruded into articles of any predetermined shape when heated to the softened state.

An "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

The monomer composition useful for preparing the acetoacetyl functional polymer may comprise one or more acetoacetyl functional monomers. The acetoacetyl functional monomers may have one or more acetoacetyl functional groups represented by:

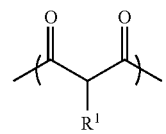

wherein $R^1$ is hydrogen, an alkyl having 1 to 10 carbon atoms, or phenyl.

Examples of acetoacetyl functional groups include

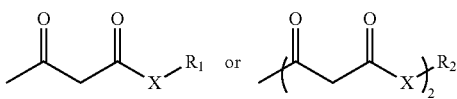

wherein X is O, $R_1$ is a divalent radical, and $R_2$ is a trivalent radical that may attach the acetoacetyl functional group to a polymer backbone.

The acetoacetyl functional monomer useful for preparing the acetoacetyl functional polymer can be an ethylenically unsaturated acetoacetyl functional monomer. Suitable ethylenically unsaturated acetoacetyl functional monomers include acetoacetoxyethyl methacrylate ("AAEM"), acetoacetoxyethyl acrylate, acetoacetoxypropyl methacrylate, allyl acetoacetate, acetoacetoxybutyl methacrylate, 2,3-di(acetoacetoxy)propyl methacrylate, or combinations thereof. The monomer composition may comprise, based on the total weight of the monomer composition, 21% by weight or more, 25% by weight or more, 30% by weight or more, 35% by weight or more, 40% by weight or more, 45% by weight or more, or even 50% by weight or more, and at the same time, 80% by weight or less, 75% by weight or less, or even 70% by weight or less of the acetoacetyl functional monomer.

The monomer composition useful for preparing the acetoacetyl functional polymer may further comprise one or more mono-ethylenically unsaturated nonionic monomers. As used herein, the term "nonionic monomers" refers to monomers that do not bear an ionic charge between pH=1-14. Suitable mono-ethylenically unsaturated nonionic monomers may include, for example, mono-ethylenically unsaturated nonionic acrylic monomers that are different from the acetoacetyl functional monomer; styrene and substituted styrene such as .alpha.-methyl styrene, p-methyl styrene, t-butyl styrene, vinyltoluene, or mixtures thereof; α-olefins such as ethylene, propylene, and 1-decease; vinyl acetate, vinyl butyrate, vinyl versatate and other vinyl esters; or combinations thereof. Preferred mono-ethylenically unsaturated nonionic monomers are selected from $C_1$-$C_{18}$, $C_4$-$C_{12}$, or $C_8$-$C_{10}$ alkyl esters of (meth)acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, (meth)acrylonitrile, (meth)acrylamide, or mixtures thereof. More preferred mono-ethylenically unsaturated nonionic monomers are methyl methacrylate, ethyl acrylate, butyl acrylate, 2-ethylhexyl acrylate, or a mixture thereof. The monomer composition may comprise, based on the total weight of the monomer composition, from 0 to 70% by weight of the mono-ethylenically unsaturated nonionic monomer, for example, 5% by weight or more, 10% by weight or more, 20% by weight or more, 25% by weight or more, or even 30% by weight or more, and at the same time, 70% by weight or less, 65% by weight or less, 60% by weight or less, 55% by weight or less, or even 50% by weight or less.

In one embodiment, the monomer composition useful for preparing the acetoacetyl functional polymer comprises, based on the total weight of the monomer composition, from 30% to 80% by weight of the acetoacetyl functional monomer and from 20% to 70% by weight of the mono-ethylenically unsaturated nonionic monomer such as alkyl esters of (meth)acrylic acids. In another embodiment, the monomer composition useful for preparing the acetoacetyl functional polymer comprises, based on the total weight of the monomer composition, less than 40% by weight of styrene and substituted styrene, for example, less than 30% by weight, less than 20% by weight, less than 10% by weight, or even less than 5% by weight. In certain embodiments, the monomer composition is substantially free of styrene and substituted styrene. "Substantially free of styrene and substituted styrene" means that the concentration of styrene and substituted styrene is zero in one embodiment and can be less than 0.1% by weight in another embodiment, less than 0.2% in still another embodiment or less than 0.5% by weight in yet another embodiment, based on the total weight of the monomer composition.

The monomer composition useful for preparing the acetoacetyl functional polymer may further comprise one or more ethylenically unsaturated ionic monomers carrying at least one functional group selected from a carboxyl, carboxylic anhydride, sulphonate, or phosphate group. "Ionic monomers" herein refer to monomers that bear an ionic charge between pH=1-14. Suitable ethylenically unsaturated ionic monomers carrying at least one functional group may include, for example, α, β-ethylenically unsaturated carboxylic acids or anhydrides thereof such as (meth)acrylic acid, itaconic acid (IA), fumaric acid, anhydride, (meth)acrylic anhydride, maleic anhydride, or mixtures thereof; sodium styrene sulfonate (SSS); sodium vinyl sulfonate (SVS); 2-acrylamido-2-methylpropanesulfonic acid (AMPS); or mixtures thereof. Preferred ethylenically unsaturated ionic monomers carrying at least one functional group include sodium styrene sulfonate, sodium vinyl sulfonate, 2-acrylamido-2-methylpropanesulfonic acid, acrylic acid (AA), methylacrylic acid (MAA), itaconic acid, or mixtures thereof. The monomer composition may comprise, based on the total weight of the monomer composition, from 0 to 50% by weight, from 10% to 40% by weight, or from 20% to 30% by weight of the ethylenically unsaturated ionic monomer carrying at least one functional group.

In one embodiment, the monomer composition useful for preparing the acetoacetyl functional polymer is substantially free of one or more multiethylenically unsaturated monomers. "Substantially free of one or more multiethylenically unsaturated monomers" means that the concentration of the multiethylenically unsaturated monomers is zero in one embodiment and can be less than 1% by weight in another embodiment, less than 0.5% by weight in still another embodiment or even less than 0.1% by weight in yet another embodiment, based on the total weight of the monomer composition. Examples of suitable multiethylenically unsaturated monomers include butadiene, allyl(meth)acrylate, divinyl benzene, ethylene glycol dimethacrylate, butylene glycol dimethacrylate, or mixtures thereof. In one embodiment, the monomer composition for preparing the acetoacetyl functional polymer comprises the acetoacetyl functional monomer and the rest being an additional acrylic monomer that is different from the acetoacetyl functional monomer. The amount of the acetoacetyl functional monomer used is as described above. The additional acrylic monomer may comprise those acrylic monomers described in the mono-ethylenically unsaturated nonionic acrylic monomers above such as the alkyl esters of (meth)acrylic acids, (meth)acrylonitrile, and (meth)acrylamide; acrylic monomers described in the ethylenically unsaturated ionic monomers carrying at least one functional group above such as (meth)acrylic acid; acrylic monomers described in the multiethylenically unsaturated monomers above, and mixtures thereof.

In another embodiment, the acetoacetyl functional polymer is prepared by suspension polymerization of a monomer composition comprising, based on the total weight of the monomer composition, from 30% to 80% by weight of the acetoacetyl functional monomer such as AAEM and from 20% to 70% by weight of the additional acrylic monomer that is different from the acetoacetyl functional monomer.

In yet another embodiment, the acetoacetyl functional polymer is prepared by suspension polymerization of a monomer composition comprising, based on the total weight of the monomer composition, from 30% to 80% by weight of the acetoacetyl functional monomer such as AAEM, from 20% to 70% by weight of alkyl esters of (meth) acrylic acids such as methyl methacrylate, ethyl acrylate, butyl acrylate, 2-ethylhexyl acrylate, or mixtures thereof; and from 0 to 40% by weight of α, β-ethylenically unsaturated carboxylic acids or anhydrides such as acrylic acid, methacrylic acid, itaconic acid (IA), fumaric acid, or mixtures thereof.

The acetoacetyl functional polymer of the present disclosure may be prepared by suspension polymerization of the monomer composition described above. Total weight concentration of monomers for preparing the acetoacetyl functional polymer is equal to 100%. A mixture of monomers (i.e., the monomer composition) may be added neat or as an oil phase including a free radical initiator; or added in one or more additions or continuously, linearly or nonlinearly, over the reaction period of preparing the acetoacetyl functional polymer. The monomer composition may be first mixed with a free radical initiator and a chain transfer agent to form an oil phase, and then the oil phase may be added into a water phase. The water phase may comprise a stabilizer and, optionally, an inorganic salt such as sodium chloride, potassium chloride, and sodium sulphate; an inhibitor such as 4-hydroxy-2,2,6,6-tetramethylpiperidin-1-oxyl ("4-Hydroxy-TEMPO"); or mixtures thereof. The monomers can be suspended as droplets often of diameter from 1 μm to 1,000 μm in water. The suspension polymerization may be conducted under nitrogen ($N_2$) atmosphere. The suspension polymerization is typically conducted under agitation at a speed of from 5 to 1000 revolutions per minute (rpm), from 20 to 600 rpm, or from 50 to 300 rpm. Temperatures suitable for suspension polymerization may be in the range of from 20° C. to 99° C., or in the range of from 60° C. to 90° C. Time duration for suspension polymerization may be in the range of from 1 to 30 hours, or in the range of from 3 to 9 hours. The resultant acetoacetyl functional polymer may be isolated by filtration and optionally washed with one or more solvents. Suitable solvents for washing the acetoacetyl functional polymer may include tetrahydrofuran, methanol, acetone, water, or mixtures thereof. In certain embodiments, the solvent is a mixture of methanol and water. The resultant acetoacetyl functional polymer may be further dried, for example, under vacuum.

In the suspension polymerization of the monomer composition, free radical initiators may be used to initiate the polymerization. Examples of suitable free radical initiators include benzoyl peroxide, lauroyl peroxide, dioctanoyl peroxide, 2,2'-azobisisobutyronitrile and 2,2'-azobis(2,4-dimethylvaleronitrile), or mixtures thereof. The free radical initiators may be used typically at a level of from 0.01% to 5% by weight or from 0.1% to 2% by weight, based on the total weight of the monomer composition.

Suspension polymerization of the monomer composition for preparing the acetoacetyl functional polymer may be conducted in the presence of one or more stabilizers. The stabilizers are compounds useful for preventing agglomeration of monomer droplets. Examples of suitable stabilizers include polyvinyl alcohol (PVA), polyacrylic acid, polyvinyl pyrrolidone, polyalkylene oxide, barium sulphate, magnesium sulphate, sodium sulphate, gelatin, poly(diallyldimethylammonium chloride) (PDMAC), hydroxypropyl methylcellulose (HPMC), or mixtures thereof. Preferred stabilizers are polyvinyl alcohol, gelatin, poly(diallyldimethylammonium chloride), or mixtures thereof. In one embodiment, the stabilizers are added in at least two additions. A first portion of the stabilizers may be added prior to polymerization, e.g., by mixing with the monomer composition; and a second portion of the stabilizers may be added during polymerization, for example, from 10 to 100 minutes or from 20 to 60 minutes after the beginning of the suspension polymerization (e.g., when reaction temperature reaches 60° C.). In a preferred embodiment, the second portion of the stabilizers comprises gelatin.

The stabilizer may be used in an amount of from 0.01% to 3% by weight or from 0.1% to 2% by weight, based on the total weight of the monomer composition. When the stabilizer is added in at least two additions, the first addition may be from 10% to 90% by weight and the second addition, preferably comprising gelatin, may be from 10% to 90% by weight, based on the total weight of the stabilizer.

Suspension polymerization of the monomer composition for preparing the acetoacetyl functional polymer may be conducted in the presence of one or more chain transfer agents. The chain transfer agents may include thiols, halocarbons such as carbon tetrachloride, or mixtures thereof. Examples of suitable chain transfer agents include 3-mercaptopropionic acid, n-dodecyl mercaptan (nDDM), methyl 3-mercaptopropionate, butyl 3-mercaptopropionate, benzenethiol, azelaic alkyl mercaptan, or mixtures thereof. The chain transfer agent may be used in an effective amount to control the molecular weight of the acetoacetyl functional polymer. For example, the chain transfer agent may be present in an amount of from 0.01% to 5% by weight, from 0.2% to 3% by weight, or from 0.4% to 2% by weight, based on the total weight of the monomer composition used for preparing the acetoacetyl functional polymer.

The resultant acetoacetyl functional polymer of the present disclosure is usually present in the form of beads. The acetoacetyl functional polymer may have an average particle size of from 10 to 2000 micrometers (μm), from 50 to 1500 μm, from 100 to 1000 μm, or from 200 to 700 μm. The particle size herein refers to population based average particle size as measured by Beckman Coulter RapidVue optical microscopes.

The acetoacetyl functional polymer obtained from suspension polymerization may comprise as polymerized units, based on the weight of the acetoacetyl functional polymer, from 21% to 80% by weight of the acetoacetyl functional monomer and from 20% to 79% by weight of other monomers including, for example, the mono-ethylenically unsaturated nonionic monomers and the ethylenically unsaturated ionic monomer carrying at least one functional groups described above used in suspension polymerization. The weight content of each monomer based on the total weight of the monomer composition may be substantially the same as the weight content of such monomer as polymerized units of the acetoacetyl functional polymer based on the weight of the acetoacetyl functional polymer.

The acetoacetyl functional polymer of the present disclosure may have a number average molecular weight of from 2,000 to 300,000, from 3,000 to 100,000, from 5,000 to 50,000, or from 7,000 to 20,000, as measured by Gel Permeation Chromatography (GPC) with Polystyrene Narrow standards having molecular weights ranging from 2329000 to 580 g/mol.

The acetoacetyl functional polymer of the present disclosure may have a glass transition temperature (Tg) of from 20° C. to 95° C., from 30° C. to 80° C., from 40° C. to 70°

C., or from 50° C. to 60° C. Tg is measured according to the method described in the Examples section below.

The acetoacetyl functional polymer of the present composition can cause aldehyde abatement (i.e., reduction). Examples of aldehydes include formaldehyde, acetaldehyde, acrolein, propionaldehyde, and crotonaldehyde. The reaction of the acetoacetyl functional polymer with aldehyde is irreversible as compared to those conventional physical absorbers such as micro porous aluminosilicate and zeolite powder. The acetoacetyl functional polymer can provide high aldehyde abatement efficiency, for example, formaldehyde abating efficiency in the range of from 75 milligrams formaldehyde per gram of the acetoacetyl functional polymer (mg/g) to 130 mg/g, or from 80 mg/g to 110 mg/g, as determined by a headspace GC-Mass method described in the Examples section below. Not wishing to be bound by any particular theory, it is believed that the acetoacetoxy group present in the acetoacetyl functional polymer reacts with aldehydes present in air or in a composition, such as by a nucleophilic addition reaction, which reduces the aldehyde concentration.

The acetoacetyl functional polymer of the present disclosure can be processed into different forms. In one embodiment, the acetoacetyl functional polymer can be dissolved in a solvent to form a solution. Such solution can be coated to a substrate to form a continuous film. Examples of suitable solvents include ethyl acetate, tetrahydrofuran, acetone, or mixtures thereof. The acetoacetyl functional polymer can form a solution at a concentration of 10% to 90% or from 15% to 70% when dissolved in ethyl acetate at room temperature for 12 hours with or without agitation, as determined by the method described in the Examples section below. The solubility of the acetoacetyl functional polymer in a solvent enables it to be miscible with other solvent systems; thus the acetoacetyl functional polymer can be used in solvent-borne applications such as adhesives without compatibility concerns. In another embodiment, the acetoacetyl functional polymer of the present disclosure, usually in the form of beads, is a thermoplastic material that can be annealed and thus melted to form a continuous film upon heating. The acetoacetyl functional polymer is useful in various applications including, for example, coatings, automotives, elastomers, and adhesives.

The present disclosure also relates to a process for removing aldehydes from a polymer composition comprising aldehydes by adding the acetoacetyl functional polymer into the polymer composition. The polymer composition may further comprise an additional polymer including, for example, a polyolefin such as polyethylene and polypropylene, a thermoplastic olefin such as a thermoplastic olefin comprising polyolefin elastomers, an epoxy resin, a different acrylic polymer, a polyurethane, or mixtures thereof. The acetoacetyl functional polymer may be added in the form of beads or a solution. The polymer composition can be processed by conventional compounding processes, e.g., extrusion, injection, and compression molding. The acetoacetyl functional polymer may be used in an amount of from 0.001% to 5% by weight, from 0.01% to 1% by weight, or from 0.1% to 0.5% by weight, based on the weight of the polymer composition.

EXAMPLES

Some embodiments of the present disclosure will now be described in the following Examples, wherein all parts and percentages are by weight unless otherwise specified.

Acetoacetoxyethyl methacrylate (AAEM) is available from Eastman Chemical.

Styrene ("ST") and methyl methacrylate ("MMA") are both available from The Dow Chemical Company.

n-Dodecyl mercaptan ("nDDM"), available from Sinopharm Chemical Reagent Co. Ltd. (SCRC), is used as a chain transfer agent.

Polyvinyl alcohol (PVA) (3 wt % aqueous solution), available from SCRC, is used as a stabilizer.

Poly(diallyldimethylammonium chloride) (PDMAC) (15 wt % aqueous solution), hydroxypropyl methylcellulose (HPMC) (2 wt % aqueous solution), and gelatin, all available from The Dow Chemical Company, are used as stabilizers.

Benzyl peroxide (BPO), lauroyl peroxide (LPO), and azobisisobutyronitrile (AIBN), all available from The Dow Chemical Company, are used as initiators.

The following standard analytical equipment and methods are used in the Examples.
Differential Scanning Calorimetry (DSC)

Glass transition temperature (Tg) of a polymer was measured by DSC. 5-10 milligram (mg) of a sample was analyzed in a crimped aluminum pan on a TA Instrument DSC Q2000 fitted with an auto-sampler under nitrogen. Tg measurement by DSC was conducted for 3 cycles: $1^{st}$ cycle: from $-60°$ C. to $160°$ C., 10 degree Celsius per minute (° C./min), and hold for 3 minutes (min); $2^{nd}$ cycle: from $160°$ C. to $-60°$ C., $10°$ C./min, hold for 3 min; and $3^{rd}$ cycle: from $-60°$ C. to $160°$ C., $10°$ C./min, and hold for 3 min. Tg was obtained from the $3^{rd}$ cycle by the half height method.
Gel Permeation Chromatography (GPC)

Molecular weight of a polymer was measured by GPC analysis using Agilent 1200. The sample was dissolved in tetrahydrofuran (THF)/formic acid (FA) (5%) with a concentration of 2 mg/mL and then filtered through 0.45 μm polytetrafluoroethylene (PTFE) filter prior to the GPC analysis. The GPC analysis was conducted using the following conditions:

Column: One PLgel GUARD columns (10 μm, 50×7.5 mm), One Mixed B columns (7.8×300 mm) in tandem; column temperature: 40° C.; mobile phase: THF/FA (5%); flow rate: 1.0 mL/minute; injection volume: 100 μL; detector: Agilent Refractive Index detector, 40° C.; and calibration curve: PL Polystyrene Narrow standards with molecular weights ranging from 2329000 to 580 g/mol, using polynom 3 fitness.
Solubility 60 g of a polymer was added into a different amount of ethyl acetate at room temperature under mild stirring, was allowed to dissolve for 12 hours, and then was observed by the naked eyes.

If a clear solution was obtained, the solution was filtered, weighed, and recorded as $W_a$. Then the solution was rotary evaporated until it reached a constant value. The obtained polymer solids were weighed and recorded as $W_b$. The concentration of the solution, C, was defined as C %=$W_b$/$W_a$.
Efficiency of Formaldehyde Abatement Measurement A polymer's efficiency in abating formaldehyde was evaluated by the amount of formaldehyde abated by the polymer as measured by Headspace Gas Chromatography-Mass Spectrometry (GC-MS) analysis. An aliquot of 0.01 g of the polymer was precisely weighed and recorded as $W_{sample}$ (g), and then put into a 20 mL headspace vial. An aliquot of excess formaldehyde solution (15-30 μl, 50000 ppm, w/w, in acetonitrile) was spiked into the headspace vial. The weight of formaldehyde injected into the headspace vial was recorded as $W_i$ (mg), and then the lip of the headspace vial was sealed. The headspace vial was heated at 60° C. for 16 hours to allow the polymer to react with formaldehyde in the headspace vial. Then, formaldehyde remaining in the headspace vial was quantified by using headspace GC-MS technique and the amount of the remaining formaldehyde was recorded as $W_R$ (mg). The efficiency of formaldehyde abatement (mg/g) was calculated by the following equation:

Efficiency of formaldehyde abatement (mg/g)=$W_i$−$W_R$)/$W_{sample}$

Each polymer sample was tested for three times and results were reported as average values.

Calibration curves of formaldehyde were developed by injection of 10 μL, 20 μL, and 30 μL of 50000 ppm formaldehyde solution into three headspace vials, and then analyzed under the same conditions as analyzing formaldehyde abatement of the polymer above.

Headspace GC-MS analysis was conducted on a 6890A Gas chromatograph, 5975C mass spectrometer and an Agilent G1888 headspace auto sampler under conditions as follows:

Inlet temperature: 250° C.;
GC Oven program: 80° C., hold for 5 min; 35° C./min ramp to 230° C., hold for 1 minute;
Headspace oven program: 100° C., hold for 15 min;
GC column: SGE SOLGEL-WAX, 30 m×250.00 μm ID., 0.25 μm film thickness;
Flow rate: 0.7 mL/min;
Average Velocity: 17.0 cm/sec;
MS Source temperature: 230° C., MS Quad temperature: 150° C., Aux-2 Temperature: 280° C.; and
MA Acquire Mode was set in selected ion monitoring (SIM) mode, where three ions were selected: 29 Da, 30 Da, and 40 Da, and the Dwell time of all three ions were set at 50 milliseconds (ms). Formaldehyde was quantified using SIM mode.

Determination of Residual Styrene Monomer

Residual styrene monomer was measured by Headspace GC-MS analysis. An aliquot of 10 mg of polymer sample was weighed and put into a 20 mL headspace vial. An aliquot of 4 μL of 500 ppm styrene standard (in acetonitrile, w/v) solution was injected into another blank headspace vial as styrene standard. Both sample vial and standard vial were heated at 100° C. for 15 min in a headspace oven. The styrene content in the polymer sample was quantified using headspace GC-MS method by comparing with the peak area of styrene standard. Headspace GC-MS analysis was conducted on a 6890A Gas chromatograph, 5975C mass spectrometer and an Agilent G1888 headspace auto sampler under conditions as follows:

Inlet temperature: 250° C.;
GC Oven program: 80° C., hold for 5 minute; 35° C./min ramp to 230° C., hold for 1 minute;
Headspace oven program: 100° C., hold for 15 min;
GC column: SGE SOLGEL-WAX, 30 m×250.00 μm ID., 0.25 μm film thickness;
Flow rate: 0.7 mL/min;
Average Velocity: 17.0 cm/sec;
MS Source temperature: 230° C., MS Quad temperature: 150° C., Aux-2 Temperature: 280° C.; and
MA Acquire Mode was set in scan mode (mass from 29 to 300 Da) and the residual styrene monomer was quantified using scan mode.

Example (Ex) 1

A one liter, three neck reactor equipped with a condenser, a mechanical stirrer and inlet for nitrogen ($N_2$) was fed with deionized (DI) water (400 g), PDMAC (10.4 g) and gelatin (0.3 g). The obtained water phase was heated to 75° C. under a gentle $N_2$ flow. In a separate container, oil phase was prepared by mixing monomers, an initiator, and a chain transfer agent (CTA) if used, based on formulations given in Table 1. Agitation was applied to completely dissolve the initiator. Then the oil phase was added into the water phase under mild agitation (agitation speed is given in Table 1). The resultant reaction mixture was then heated up to 85° C. After 30 min, another shot of gelatin (0.3 g) was added into the reactor. The reaction proceeded for 3 hours and further continued at 107° C. for half an hour, which is defined as the oil bath temperature. This is to further boost the conversion of monomers. After that, the reactor was cooled down to room temperature. The micro-beads were gravitically settled at the bottom of the flask. The solid particles were collected via filtration and washed repeatedly with MeOH/$H_2O$ solution mixture at a ratio of 1/1 (v/v). The obtained polymer particles were then vacuum-dried at 50° C. overnight. Properties of the polymer are also given in Table 1.

Exs 2 and 3 and Comparative (Comp) Ex A

Exs 2 and 3 and Comp Ex A were conducted according to the same procedure described above in Ex 1, based on monomers and conditions given in Table 1.

TABLE 1.

| | Monomers MMA (g) | Initiator AAEM (g) | CTA LPO (g) | Agitation nDDM (g) | speed (RPM) | Properties of polymers | | | |
|---|---|---|---|---|---|---|---|---|---|
| | | | | | | Particle size (μm)* | $M_n$** | $M_w$** | $T_g$ (° C.) |
| Ex 1 | 60 | 60 | 0.6 | 0.6 | 150 | 468 | 18600 | 73500 | 52.5 |
| Ex 2 | 60 | 60 | 0.6 | 1 | 300 | 254 | 10000 | 38800 | 35.8 |
| Ex 3 | 20 | 40 | 0.3 | 0.36 | 150 | 222 | 14500 | 78300 | 30.4 |
| Comp Ex A | 60 | 60 | 0.6 | 0 | 150 | 376 | N/A | N/A | 67.5 |

*Population based average particle size as measured by Beckman Coulter RapidVue optical microscope;
**$M_n$ refers to number average molecular weight and $M_w$ refers to weight average molecular weight, as measured by GPC.

Comp Ex B

Comp Ex B was conducted according to the same procedure described above in Ex 1, based on monomers and conditions (e.g., agitation speed when the oil phase was added into the water phase) given in the table below.

| | Monomers | | | Initiator | CTA | Agitation | Polymer properties | |
|---|---|---|---|---|---|---|---|---|
| | ST (g) | AAEM (g) | DVB (g) | LPO (g) | nDDM (g) | speed (RPM) | Particle size | $T_g$ (°C.) |
| Comp Ex B | 24 | 50 | 1 | 0.37 | 0 | 150 | N/A* | 42.6 |

*Large agglomeration was formed, so particle size was not available.

Comp Ex C

PRIMAL™ SF-230 polymer emulsion, available from The Dow Chemical Company, was dried via spray dry process to obtain polymer dry powder (PRIMAL is a trademark of The Dow Chemical Company).

The obtained acetoacetyl functional polymers were evaluated for formaldehyde abatement efficiency, residual styrene, and solubility in ethyl acetate, according to the test methods described above. Results are given in Table 2. As shown in Table 2, the acetoacetyl functional polymers of Exs 1 and 2 both demonstrated higher FA abating efficiency than that of Comp Ex A. Particularly, the acetoacetyl functional polymer in Ex 2 with smaller particle size demonstrated even better formaldehyde abating efficiency than that of Ex 1. In addition, the polymers of Ex 3 and Comp Ex B comprising the same content of polymerized units of AAEM demonstrated comparable formaldehyde abating efficiency. However, the polymer of Comp Ex B contained a large amount of residual ST monomer (5.8 mg/g), which may be due to poor copolymerization of ST with AAEM. Also, the polymer of Comp Ex B had a strong smell of ST, which largely limits its applications such as in indoor and in-car formaldehyde abatement applications. Moreover, the polymer beads of Exs 1-3 were readily dissolved in ethyl acetate with gentle agitation at room temperature within 2 hours. However, the polymers of Comp Exs A-C were not soluble in ethyl acetate and remained in their original particle shape at room temperature even after heating at 60° C. In addition, the acetoacetyl functional polymers of Exs 1-3 deformed when heated at a temperature above their Tgs, respectively. Thus, the acetoacetyl functional polymers of the present invention can be used for melt processing and also potentially be used as solvent free coating materials.

TABLE 2

| Sample ID | Average formaldehyde abatement efficiency (mg/g) | Residual styrene (mg/g) | Solution concentration* (%) |
|---|---|---|---|
| Ex 1 | 79.6 ± 4.4 | 0 | 25 |
| Ex 2 | 97.6 ± 4.3 | 0 | 38 |
| Ex 3 | 110.0 ± 3.3 | 0 | 30 |

TABLE 2-continued

| Sample ID | Average formaldehyde abatement efficiency (mg/g) | Residual styrene (mg/g) | Solution concentration* (%) |
|---|---|---|---|
| Comp Ex A | 75.8 ± 5.6 | 0 | insoluble |
| Comp Ex B | 102.0 ± 0.6 | 5.8 ± 0.1 | insoluble |
| Comp Ex C | 8.7 ± 0.1 | NA | insoluble |

*Concentration refers to the concentration of a solution of polymers when dissolved in ethyl acetate at room temperature for 12 hours.

What is claimed is:

1. A process for removing aldehydes from a polymer composition comprising aldehydes by adding to the polymer composition an acetoacetyl functional polymer prepared by suspension polymerizing a monomer composition in the presence of a chain transfer agent and a stabilizer, wherein the monomer composition comprises, based on the total weight of the monomer composition, from 21% to 80% by weight of an acetoacetyl functional monomer.

2. The process of claim 1, wherein the monomer composition comprises, based on the total weight of the monomer composition, from 30% to 80% by weight of the acetoacetyl functional monomer and from 20% to 70% by weight of an additional acrylic monomer.

3. The process of claim 1, wherein at least one portion of the stabilizer is added during polymerization of the monomer composition.

4. The process of claim 1, wherein the stabilizer is selected from the group consisting of gelatin, polyvinyl alcohol, polyacrylic acid, polyvinyl pyrrolidone, polyalkylene oxide, barium sulphate, magnesium sulphate, sodium sulphate, poly(diallyldimethylammonium chloride), hydroxypropyl methylcellulose, and mixtures thereof.

5. The process of claim 1, wherein the polymer has an average particle size of from 10 to 2000 micrometers.

6. The process of claim 1, wherein the acetoacetyl functional monomer is selected from the group consisting of acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, and mixtures thereof.

7. The process of claim 1, wherein the monomer composition comprises, based on the total weight of the monomer composition, less than 0.5% by weight of styrene or substituted styrene.

* * * * *